United States Patent
Choi et al.

(10) Patent No.: US 8,307,133 B2
(45) Date of Patent: Nov. 6, 2012

(54) METHOD OF PROVIDING INTEROPERABILITY OF HETEROGENEOUS NETWORK DEVICES AND NETWORK DEVICE USING THE SAME

(75) Inventors: Moon-Jeong Choi, Seoul (KR); Sang-Do Park, Seoul (KR); Jun-Hyeong Kim, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1198 days.

(21) Appl. No.: 11/518,888

(22) Filed: Sep. 12, 2006

(65) Prior Publication Data

US 2007/0136451 A1 Jun. 14, 2007

(30) Foreign Application Priority Data

Dec. 14, 2005 (KR) .................. 10-2005-0122898

(51) Int. Cl.
*G06F 13/12* (2006.01)
*G06F 13/38* (2006.01)
*G06F 15/173* (2006.01)

(52) U.S. Cl. ........................ 710/62; 709/223
(58) Field of Classification Search ............ 710/62
See application file for complete search history.

(56) References Cited

U.S. PATENT DOCUMENTS

| | | | |
|---|---|---|---|
| 7,577,876 B2* | 8/2009 | Boyce | 714/39 |
| 8,180,620 B2* | 5/2012 | Nightingale | 703/14 |
| 2002/0018066 A1* | 2/2002 | Vizer | 345/428 |
| 2004/0034853 A1 | 2/2004 | Gibbons et al. | |
| 2004/0093536 A1* | 5/2004 | Weller | 714/33 |
| 2006/0026305 A1* | 2/2006 | Illowsky et al. | 710/8 |
| 2006/0133414 A1* | 6/2006 | Luoma et al. | 370/466 |

FOREIGN PATENT DOCUMENTS

| | | |
|---|---|---|
| JP | 2001-211470 | 8/2001 |
| KR | 10-1999-0056015 | 7/1999 |
| KR | 10-1999-0061003 | 7/1999 |
| KR | 10-2004-0032398 | 4/2004 |
| KR | 10-2004-00045791 | 6/2004 |
| KR | 10-2005-0060793 A | 6/2005 |

* cited by examiner

*Primary Examiner* — Chun-Kuan Lee
*Assistant Examiner* — Brooke Taylor
(74) *Attorney, Agent, or Firm* — NSIP Law

(57) ABSTRACT

A method and device of enabling interoperation between different devices over a network are provided. A test code corresponding to a service to be performed using device information received from a service providing device in a network is generated, the test code is transmitted to the service providing device, a result of the test code execution is received from the service providing device, and interoperability with the service providing device is determined with respect to the service by using the result of the execution of the test code. An environment suitable for interoperation with the service providing device is established when interoperation with the service providing device is possible.

26 Claims, 4 Drawing Sheets

METHOD OF PROVIDING INTEROPERABILITY OF HETEROGENEOUS NETWORK DEVICES AND NETWORK DEVICE USING THE SAME

CROSS-REFERENCE TO RELATED APPLICATIONS

This application claims the benefit under 35 U.S.C. §119 (a) of Korean Patent Application No. 10-2005-122898, filed Dec. 14, 2005, in the Korean Intellectual Property Office, the entire disclosure of which is hereby incorporated by reference.

BACKGROUND OF THE INVENTION

1. Field of the Invention

The following description relates to middleware. More particularly, the following description relates to a method of enabling ready and stable interoperation between different devices in a dynamic network environment and a network device using the method.

2. Description of the Related Art

Middleware consists generally of software connecting different servers and clients in a variety of computing environments. Also, in a narrow range of meaning, middleware consists of software bridging the difference between various types of hardware, network protocols, application programs, local area network (LAN) environments, personal computer (PC) environments and operating systems installed within a single company. Namely, middleware is software enabling smooth communication between an application program and an operating environment in complex heterogeneous networks.

With the popularity of super high speed Internet and development of short range wireless communication technology, interoperation between different devices is becoming increasingly important. For example, home network devices may have a need to interoperate with each other for proper execution.

In particular, when the properties of other devices are not known, network devices need to interoperate with other devices in a dynamic network environment, such as an ad hoc network. For example, when a user of a home network-based audio system purchases a new personal digital assistant (PDA) and takes the PDA home, the user may want to play an MP3 file stored in the PDA using the networked audio system. In such an installation, network devices frequently need to interoperate with each other without knowing the properties of other devices on the network.

When all network devices in a network support a particular protocol and interoperate with other devices in the network, interoperation between the network devices and the other devices may be enabled by setting the network devices to operate according to the particular protocol. However, in an ad hoc network environment where networked devices are more diversified and the platform or protocol of each device is different, network devices not knowing the properties of other network devices may not readily interoperate with the other devices.

Accordingly, a method and device for enabling stable and effective interoperation between different network devices is needed.

SUMMARY OF THE INVENTION

General aspects secure ready and stable interoperation between different devices without knowing the properties of other devices.

It is an aspect to enable ready and effective interoperation between different devices without being limited by type of device or system property.

It is another aspect to enable easy interoperation between different devices without requiring user manipulation, thereby improving convenience.

It is another aspect to dynamically expand a function necessary for device interoperation by appropriately providing a service providing device with its necessary function expansion module, and to enable ready interoperation.

It is a further aspect to provide device interoperation having forward compatibility by enabling easy interoperation between new device and existing devices.

General aspects provide a method of enabling interoperation between different devices on a network. The method includes generating a test code corresponding to a service to be performed using device information received from a service providing device in a network, and transmitting the test code to the service providing device, receiving a result of an execution of the test code from the service providing device, and determining interoperability with the service providing device with respect to the service by using the result of the execution of the test code. The method further includes establishing an environment suitable for interoperation with the service providing device, when interoperation with the service providing device is possible.

Determining interoperability includes transmitting the test code to the service providing device and receiving the result of the execution of the test code from the service providing device, generating a function expansion module necessary for the service providing device performing the interoperation by using the result of the execution of the test code, including the function expansion module in the test code and transmitting the test code to the service providing device, and determining the interoperability by using the result of the execution of the test code received from the service providing device, the service providing device being dynamically expanded by the function expansion module.

General aspects provide a network device, including a test code generation unit for generating a test code corresponding to a service to be performed using device information received from a service providing device in a network, and an interoperability determination unit for transmitting the test code to the service providing device, receiving a result of an execution of the test code from the service providing device and determining interoperability with the service providing device with respect to the service by using the result of the execution of the test code. The network device further includes an environment establishment unit for establishing an environment suitable for interoperation with the service providing service, when interoperation with the service providing device is possible.

The network device may further include a function expansion module generation unit for generating a function expansion module necessary for the service providing device performing the interoperation by using the result of the execution of the test code, and including the function expansion module in the test code and transmitting the test code to the service providing device.

The network device may further provide that the network may be an ad hoc network.

The network device may further provide that the function expansion module can comprise transmitted/received mobile code.

BRIEF DESCRIPTION OF THE DRAWINGS

General aspects will become more apparent from the following detailed description when taken in conjunction with the accompanying drawings, in which.

Throughout the drawings, like reference numbers should be understood to refer to like elements, features, and structures.

DETAILED DESCRIPTION

The matters exemplified in this description are provided to assist in a comprehensive understanding of general aspects disclosed with reference to the accompanying figures. Accordingly, those of ordinary skill in the art will recognize that various changes and modifications of the general aspects described herein can be made without departing from the scope of the claims. Descriptions of well-known functions and constructions are omitted for clarity and conciseness.

Figure 1:
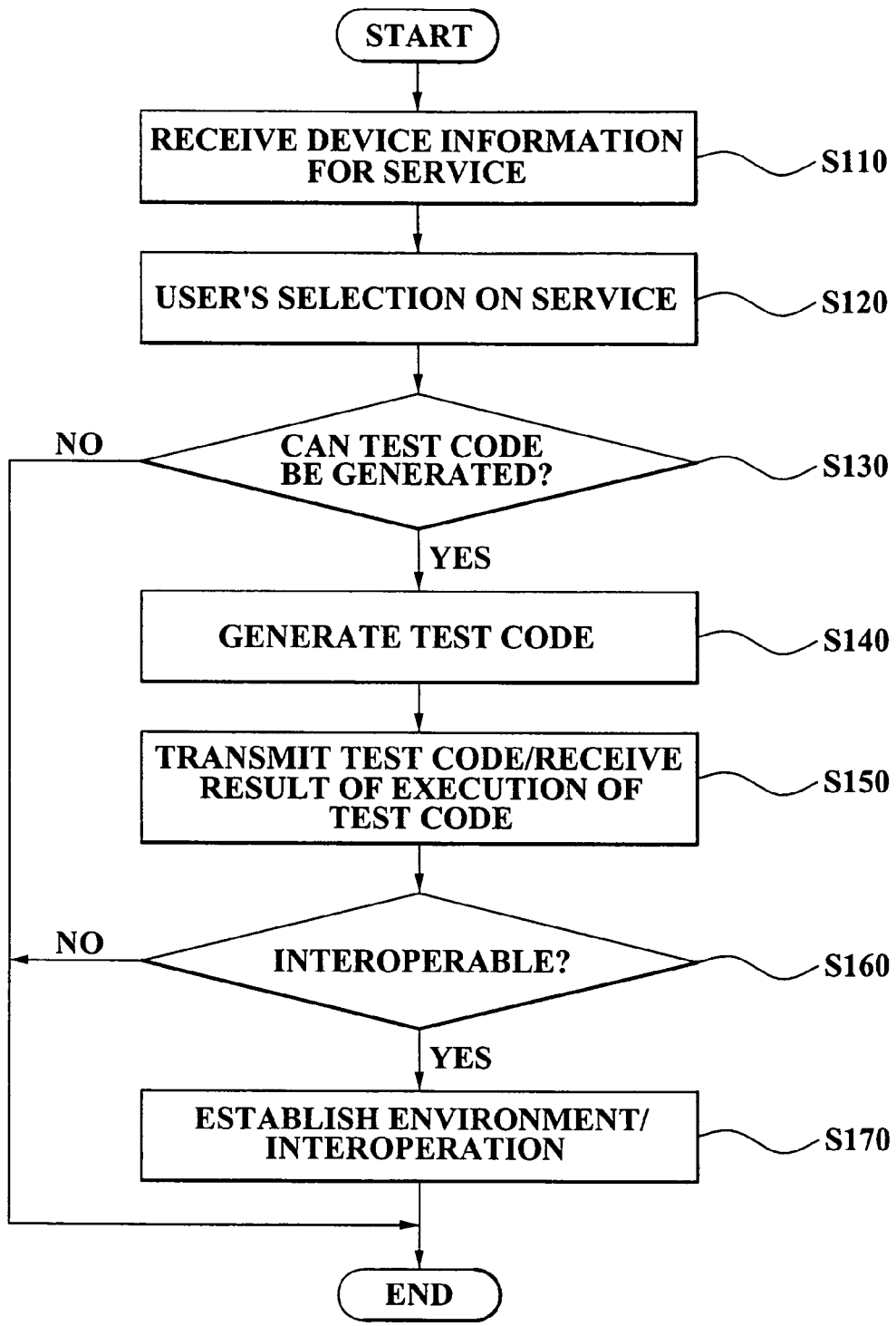
FIG. 1 is a flowchart illustrating an example of a method of enabling interoperation between different devices.

FIG. 1 is a flowchart illustrating an example of a method of enabling interoperation between different devices.

Referring to FIG. 1, device information is received from a service providing device in a network, step S110.

A control device and a service providing device exchange device information through processes such as a service announcement and a service discovery. Through this exchange, the control device receives device information of the service providing device. Interoperation, such as the service announcement and service discovery described above, can be performed according to a Rendezvous protocol and a BEEP protocol.

The device information may include operating system information, system library information, Java Virtual Machine (JVM) information, memory information and language information and central processing unit (CPU) information of the device.

When device information is received from the service providing device, the control device receives a user's selection on the service providing device and a service to be performed, step S120. For example, when the control device is a PDA and the service providing device is an MP3 player, a user may manipulate the PDA to transmit an MP3 file to the MP3 player, which is the service proving device.

After the service providing device and the service to be performed are selected, the method of enabling interoperation between different devices determines whether a test code corresponding to the service to be performed can be generated by using the device information received from the service providing device, step S130.

For example, when the control device is a PDA and the service providing device is an MP3 player, and a user manipulates the PDA to transmit an MP3 file to the MP3 player, the PDA determines whether a test code can be generated by using device information received from the MP3 player, its own device information and information on an MP3 file transmission service. The test code can be utilized for determining interoperability between the PDA and the MP3 player for file transmission. For example, when interoperation for file transmission is not possible as a result of comparing device information between the PDA and the MP3 player, the PDA may determine that the test code cannot be generated.

When the test code cannot be generated, the process ends. When the test code can be generated, the test code is generated by using device information received from the service providing device, step S140.

An appropriate test code is generated according to information about the control device, performing the operations in FIG. 1, the device information received from the service providing device, and the service to be performed.

In an example, generating the test code is performed by searching a table for a test code corresponding to the service to be performed and device information received from the service providing device. The table stores every type of test code corresponding to services and device information.

When the test code is generated, the generated test code can be transmitted to the service providing device and a result of an execution of the test code is received from the service providing device, step S150.

When execution of the test code fails, step S150 may be repeated at least a certain number of times and the test code changed for each repetition. The test code may be changed according to the result of an execution of the test code. After changing the test code according to an error type occurring when executing the test code in the service providing device, transmitting the test code and receiving the result of an execution of the test code may be repeated at least a certain number of times.

A test code can be transmitted to the service providing device, but the result the test code execution may not be received therefrom even after a period of time passes. In this case, the result of an execution of the test code may be determined as a failure. Such a determination prevents the control device from waiting for a response from the service providing device, after transmission of the test code, when the service providing device cannot transmit the result of an execution of the test code since an error occurs in the service providing device.

The method of enabling interoperation between different devices determines interoperability between the control device and the service providing device by using the result of an execution of the test code, step S160. For example, when the execution of the test code results in a success, interoperation between the control device and the service providing device may be determined as possible.

Further, an initial execution of the test code may result in a failure but a subsequent execution of the test code may result in a success. In this case, interoperation between the control device and the service providing device may be determined as possible.

When interoperation between the control device and the service providing device is possible, the method of enabling interoperation between different devices sets up the control device and the service providing device to establish an environment suitable for interoperation therebetween, and performs the service to be performed through the interoperation between the control device and the service providing device, step S170.

In this instance, the environment suitable for interoperation may be an environment in which the test code has been successfully executed.

When interoperation between the control devices is not possible, the process ends.

Figure 2:
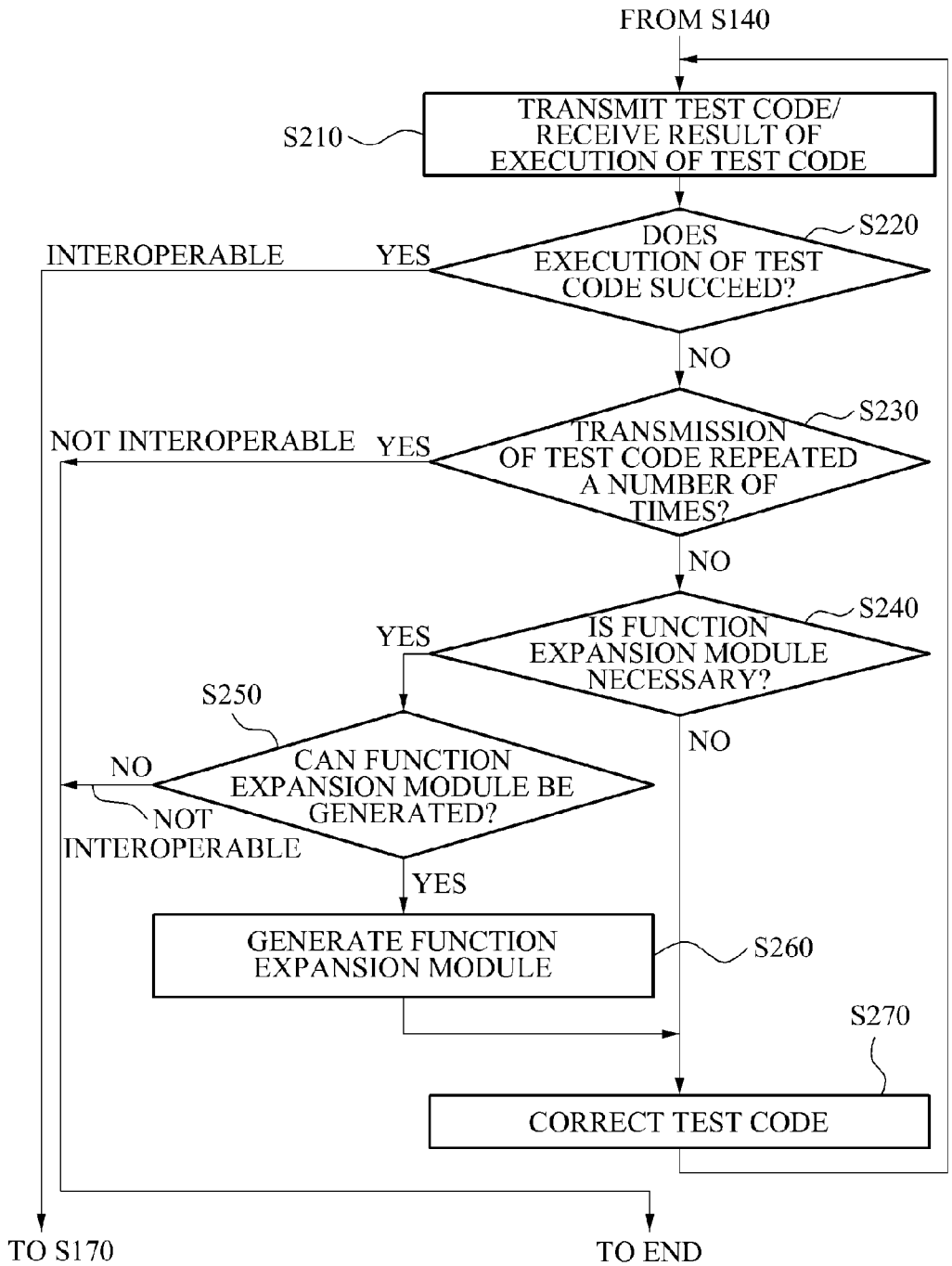
FIG. 2 is a flowchart illustrating an example of step S150 illustrated in FIG. 1.

FIG. 2 is a flowchart illustrating an example of step S150.

Referring to FIG. 2, the generated test code is transmitted to the service providing device and the result of an execution of the test code is received from the service providing device, step S210.

A determination is made whether the execution of the test code results in failure or success, step S220. For example, the result of an execution of the test code received from the service providing device may include information associated with its success/failure and, in the case of the failure, information associated with a cause of the failure. In this instance, a success indicates the test code is normally executed and a failure indicates the test code is not normally executed.

When the result of an execution of the test code is not received from the service providing device after a period of time, the execution of the test code may be determined as a failure.

When the execution of the test code is determined as a success, step S220, the control device determines that interoperation between the control device and the service providing is possible (FIG. 1, step S160 and FIG. 2, step S220).

When the execution of the test code is determined as a failure, the control device determines whether transmission of the test code has been repeated at least a certain number of times, step S230.

When transmission of the test code is determined to have been repeated at least a certain number of times, the control device determines that interoperation between the control device and the service providing is not possible (FIG. 1, step S160 and FIG. 2, step S230), in which case the process ends.

When transmission of the test code is determined to have not been repeated a certain number of times, the control device determines whether a function expansion module is necessary for interoperation with the service providing device, step 240. Determining whether the function expansion module is necessary may be performed by using the result of an execution of the test code.

When the function expansion module for interoperation is determined to be necessary, the control device determines whether the function expansion module can be generated by using the result of an execution of the test code received from the service providing device, step S250. The function expansion module can be a mobile code for dynamically expanding a function necessary when the service providing device performs the corresponding service. The mobile code can be executed in a remote location, and also may be easily executed without regard to a platform. Accordingly, when transmitting/receiving the function expansion module as a mobile code, the function may be dynamically expanded.

Further, the mobile code may not be necessary every time. The necessity of the mobile code may be determined according to the result of an execution of the test code which is performed in the service providing device. For example, whether the function expansion module can be generated can be determined by searching a table for a function expansion module corresponding to the result of an execution of the test code received from the service providing device. In this instance, the table stores every type of function expansion module.

When the control device determines that the function expansion module cannot be generated, the control device determines that interoperation between the control device and the service providing device is not possible (FIG. 1, step S160 and FIG. 2, step S250). When the control device determines that the function expansion module can be generated, the control device generates the function expansion module, step S260. For example, generation of a function expansion module may be performed by searching a table storing every type of function expansion module for a function expansion module corresponding to the result of an execution of the test code received from the service providing device.

When the function expansion module is generated or determined as unnecessary, step S240, the control device corrects the test code, step S270. In this instance, the test code may be corrected according to the result of an execution of the test code received from the service providing device. For example, correcting the test code may be performed by searching a table for a corresponding correction code. In this instance, the table stores correction codes according to a result of an execution of each test code.

Also, in operation S270, when the function expansion module is generated, the control device may include the generated function expansion module in the corrected test code. In this instance, the function expansion module may be included in the test code as a mobile code and transmitted from the control device to the service providing device. When the function expansion module is transmitted to the service providing device, the service providing device may execute the received function expansion module and dynamically expand a function.

After correcting the test code, the control device returns to step S210 and transmits the test code to the service providing device. When the function expansion module is included in the test code, the service providing device executes the received function expansion module and dynamically expands its function. The service providing device then executes a test code and provides a test code execution result to the control device. When the received result of the test code execution is a success, the control device may determine that interoperation between the control device and the service providing device is possible (FIG. 1, step S160).

Figure 3:
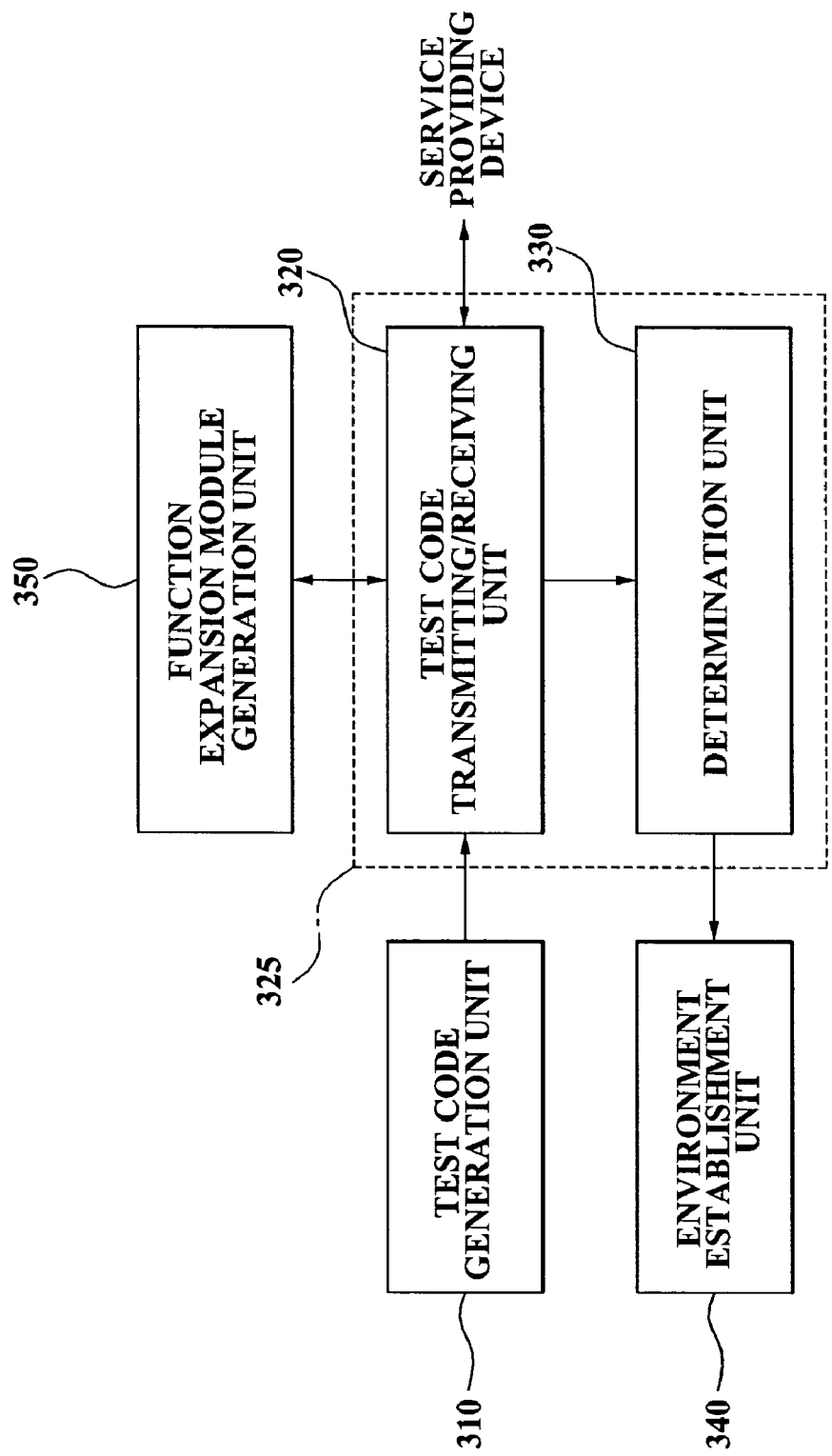
FIG. 3 is a block diagram illustrating an example of a network device.

FIG. 3 is a block diagram illustrating an example of a network device.

Referring to FIG. 3, the network device includes a test code generation unit 310, an interoperability determination unit 325, an environment establishment unit 340, and a function expansion module generation unit 350. The interoperability determination unit 325 can include a test code transmitting/receiving unit 320 and a determination unit 330.

The test code generation unit 310 generates a test code corresponding to a service to be performed by using device information received from a service providing device in a network.

In an example, the network may be an ad hoc network. Also, the device information received from the service providing device may be information which is obtained through a discovery process with respect to device information announced from the service providing device. In this case, the processes, such as an announcement and a discovery, can be performed according to a Rendezvous protocol and the like.

Also, the device information may include operating system information, system library information, Java Virtual Machine (JVM) information, memory information, language information, and CPU information of the device.

The test code generation unit 310 may generate a test code by searching a table for a test code corresponding to a service to be performed and device information received from the service providing device. In an example, the table can store every type of test code corresponding to services and device information.

The interoperability determination unit 325 transmits a test code to a service providing device and receives a test code execution result from the service providing device. Also, the interoperability determination unit 325 determines interoperability with the service providing device by using the test code execution result.

The test code transmitting/receiving unit 320 transmits the test code to the service providing device and receives the result of the test code execution from the service providing device. The determination unit 330 may determine interoperability with the service providing device with respect to the service by using the test code execution result. When execution of the test code fails, the test code transmitting/receiving unit 320 may repeat transmitting a test code and receiving a test code execution result at least a certain number of times, and changing the test code for each repetition.

When interoperation with a service providing device is possible, the environment establishment unit 340 establishes an environment suitable for interoperation with the service providing device.

When execution of a test code fails, the function expansion module generation unit 350 generates a function expansion module necessary when the service providing device performs interoperation. In this instance, the function expansion module generation unit 350 may generate a function expansion module by searching a table for a function expansion module corresponding to the result of an execution of the test code received from the service providing device. In an example, the table can store every type of function expansion module.

The generated function expansion module can be transmitted to the service providing device as a mobile code.

When the generated function expansion module in the function expansion module generation unit 350 is transmitted to the service providing device and the function thereof is dynamically expanded, the determination unit 330 may determine interoperability with the service providing device by using the result of an execution of the test code which is received from the service providing device. In this instance, the function of the service providing device is dynamically expanded by the function expansion module.

When a test code execution result is not received from the service providing device after a period of time, a network device may determine that the execution of the test code resulted in failure.

Figure 4:
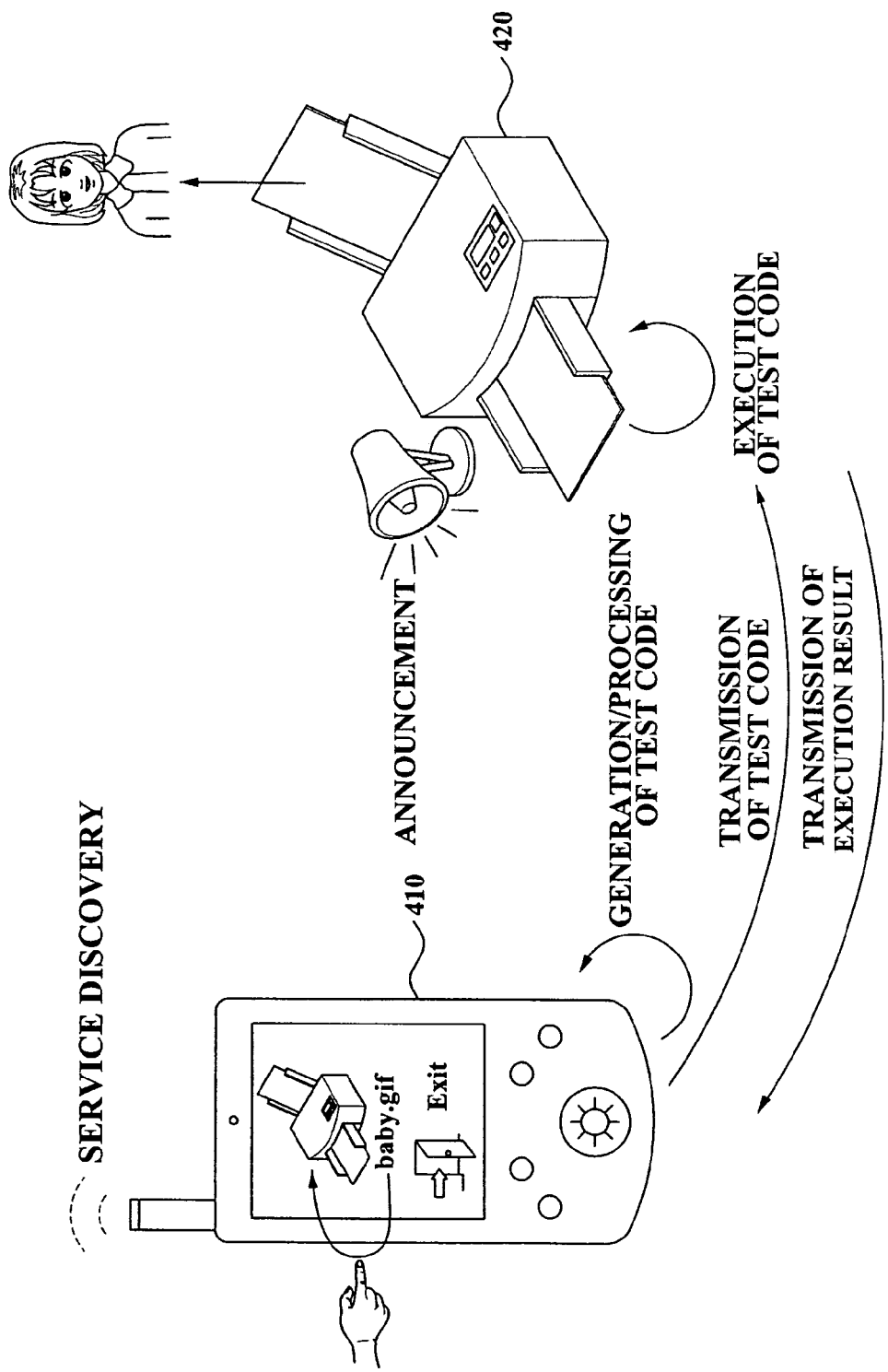
FIG. 4 is a diagram illustrating an example of interoperation between a personal digital assistant (PDA) and a photo printer.

FIG. 4 is a diagram illustrating an example of interoperation between a PDA 410 and a photo printer 420.

Referring to FIG. 4, a personal digital assistant (PDA) 410 enables a user to output a picture file to a photo printer 420, received from the PDA 410, by discovering a service announcement of the photo printer 420. The user may manipulate the PDA 410 to select a service for outputting the picture file to the photo printer 420.

When the user selects the service of outputting the picture file to the photo printer 420, the PDA 410 generates a test code by using device information of the photo printer 420 and device information of the PDA 410, and the selected service information. The test code is utilized for testing whether a function of interoperating with the PDA 410 may be performed in the photo printer 420. A test code may be generated according to device properties of the photo printer 420 or the PDA 410, or according to a service type selected by the user.

When the test code is generated, the PDA 410 transmits the test code to the photo printer 420. The photo printer 420 receives and executes the test code, and transmits the test code execution result to the PDA 410.

When interoperation between the PDA 410 and the photo printer 420 is possible, the PDA 410 establishes an environment suitable for interoperation with the photo printer 420. Further, the PDA 410 enables the user to select a picture file, baby.gif for example, for outputting to the photo printer 420.

After the user selects the picture file, baby.gif in this example, the photo printer 420 receives and prints the selected picture file.

Operations of interoperating network devices according to general aspects have been described with reference to FIG. 4. However, according to examples, when the test code execution result is a failure, the PDA 410 may transmit to the photo printer 420 a function expansion module when the photo printer 420 interoperates with the PDA 410. Through this interoperation, the PDA 410 enables the photo printer 420 to dynamically expand a function. Further, when the test code is transmitted to the photo printer 420 but no response is received after a period of time, the PDA 410 may determine that execution of the test code is a failure. When execution of the test code is determined as a failure, the PDA 410 may repeat transmitting a test code and receiving a result of the test code execution at least a certain number of times, and changing the test code for each repetition.

According to general aspects, it is possible to secure ready and flexible interoperation between different devices not knowing each other's properties.

Also, according to general aspects, it is possible to enable ready and effective interoperation between different devices without being limited by the type of device or system properties.

Also, according to general aspects, it is possible to enable easy interoperation between different devices without user manipulation, thereby improving user convenience.

Also, according to general aspects, it is possible to dynamically expand a function for interoperation by appropriately providing a service providing device with its function expansion module, and to enable ready interoperation.

While general aspects have been described above, it will be understood by those of ordinary skill in the art that various changes in form and detail may be made therein without departing from the scope of the following claims.

What is claimed is:

1. A method of enabling interoperation between different devices of a network, the method comprising:
 using device information received from a service providing device in the network to determine whether a test code corresponding to a service to be performed can be generated;
 generating the test code using the device information if it is determined that the test code can be generated;
 transmitting the generated test code to the service providing device;
 receiving a result of an execution of the test code from the service providing device; and
 using the result of the execution of the test code to determine whether interoperability with the service providing device is possible,
 wherein, if the result of the execution of the test code is successful, an environment is established with the service providing device that is suitable for interoperation therewith.

2. The method of claim 1, wherein:
 if the result of the execution of the test code is not successful and a predetermined number of results has not been received, a determination of whether a function expansion module is necessary for the interoperation with the service providing device is performed by using the result of the execution of the test code;
 if the function expansion module is determined not to be necessary:
  the test code is first corrected according to the result of the execution of the test code;
  the first corrected test code is transmitted to the service providing device;

a result of an execution of the first corrected test code is received from the service providing device; and the result of the execution of the first corrected test code is used to determine whether interoperability with the service providing device is possible;

if the function expansion module is determined to be necessary, a determination of whether the function expansion module can be generated is performed by using the result of the execution of the test code;

if it is determined that the function expansion module cannot be generated, interoperation between the service providing device is determined not to be possible;

if it is determined that the function expansion module can be generated:

the function expansion module is generated;

the test code is second corrected according to the result of the execution of the test code, the second corrected test code including the generated function expansion module;

the second corrected test code is transmitted to the service providing device, the service providing device being dynamically expanded by the generated function expansion module included in the second corrected test code;

a result of an execution of the second corrected test code is received from the service providing device; and the result of the execution of the second corrected test code is used to determine whether interoperability with the service providing device is possible; and if the result of the execution of the test code is not successful and the predetermined number of results has been received, interoperability between the service providing device is determined not to be possible.

3. The method of claim 2, wherein:
the function expansion module corresponds to the result of the execution of the test code received from the service providing device; and
the function expansion module is generated by searching a table for the function expansion module.

4. The method of claim 2, wherein
the function expansion module is included in the second corrected test code as a mobile code.

5. The method of claim 1, wherein:
if the result of the execution of the test code is a failure, the transmitting of the generated test code and the receiving of the result of the execution of the test code is repeated at least a predetermined number of times; and
the test code is changed for each repetition.

6. The method of claim 1, wherein, if the result of the execution of the test code is not received from the service providing device after a predetermined period of time from when the generated test code is transmitted to the service providing device, the result of the execution of the test code execution is determined to be not successful and interoperation between the service providing device is determined not to be possible.

7. The method of claim 1, wherein the network includes an ad hoc network.

8. The method of claim 1, wherein:
the test code corresponds to the service to be performed and the device information received from the service providing device;
if it is determined that the test code cannot be generated, interoperability is determined not to be possible with the service providing device; and
the generating of the test code comprises searching a table that stores every type of test code for the test code.

9. A network device, comprising:
a test code generation unit configured to:
use device information received from a service providing device in the network to determine whether a test code corresponding to a service to be performed can be generated;
generate the test code using the device information received if it is determined that the test code can be generated;
an interoperability determination unit configured to:
transmit the generated test code to the service providing device;
receive a result of an execution of the test code from the service providing device; and
use the result of the execution of the test code to determine whether interoperability with the service providing device is possible; and
an environment establishment unit configured to establish an environment with the service providing device that is suitable for interoperation if the result of the execution of the test code is successful.

10. The device of claim 9, further comprising:
a function expansion module generation unit configured to:
generate a function expansion module after:
a determination is made that the result of the execution of the test code is not successful;
a determination is made that a predetermined number of results has not been received;
a determination is made that the function expansion module is necessary for the interoperation with the service providing device; and
a determination is made that the function expansion module can be generated; and
include the function expansion module in a corrected test code.

11. The device of claim 10, wherein the interoperability determination unit is further configured to determine the interoperability by using a result of an execution of the corrected test code received from the service providing device of which a function is dynamically expanded using the function expansion module.

12. The device of claim 10, wherein the function expansion module corresponds to the result of the execution of the test code received from the service providing device.

13. The device of claim 10, wherein the function expansion module is included in the corrected test code as a mobile code.

14. The device of claim 9, wherein, if the result of the execution of the test code is a failure:
the interoperability determination unit repeats transmitting of the generated test code and the receiving of the result of the execution of the test code at least a predetermined number of times; and
the test code is changed for each repetition.

15. The device of claim 9, wherein, if the result of the execution of the test code is not received from the service providing device after a predetermined period of time from when the generated test code is transmitted to the service providing device, the interoperability determination unit determines that the result of the execution of the test code to be a failure and determines interoperation between the service providing device not to be possible.

16. The device of claim 9, wherein the network includes an ad hoc network.

17. The device of claim 9, wherein:
the test code corresponds to the service to be performed and the device information received from the service providing device;

if it is determined that the test code cannot be generated, interoperability is determined not to be possible with the service providing device; and the test code generation unit is further configured to search a table for the test code to be generated.

18. A computer readable medium having stored thereon instructions for enabling interoperation between different devices of a network, the instructions comprising:

a first set of instructions configured to use device information received from a service providing device in the network to determine whether a test code corresponding to a service to be performed can be generated;

a second set of instructions configured to generate the test code using the device information received if it is determined that the test code can be generated;

a third set of instructions configured to transmit the generated test code to the service providing device;

a fourth set of instructions configured to receive a result of an execution of the test code from the service providing device;

a fifth set of instructions configured to use the result of the execution of the test code to determine whether interoperability with the service providing device is possible; and a sixth set of instructions configured to establish an environment with the service providing device that is suitable for interoperation if the result of the execution of the test code is successful.

19. The instructions of claim 18, further comprising:

a seventh set of instructions configured to determine whether a function expansion module is necessary for the interoperation with the service providing device is performed by using the result of the execution of the test code if the result of the execution of the test code is not successful and a predetermined number of results has not been received;

an eighth set of instructions configured to, if the function expansion module is determined not to be necessary:
first correct the test code according to the result of the execution of the test code;
transmit the first corrected test code the service providing device;
receive a result of an execution of the first corrected test code from the service providing device; and
use the result of the execution of the first corrected test code to determine whether interoperability with the service providing device is possible;

a ninth set of instructions configured to determine whether the function expansion module can be generated is performed by using the result of the execution of the test code if the function expansion module is determined to be necessary;

a tenth set of instructions configured to determine interoperation between the service providing device not to be possible if it is determined that the function expansion module cannot be generated;

an eleventh set of instructions configured to, if it is determined that the function expansion module can be generated:
generate the function expansion module;
second correct the test code according to the result of the execution of the test code, the second corrected test code including the generated function expansion module;
transmit the second corrected test code to the service providing device, the service providing device being dynamically expanded by the generated function expansion module included in the second corrected test code;
receiving a result of an execution of the second corrected test code from service providing device; and
using the result of the execution of the second corrected test code to determine whether interoperability with the service providing device is possible; and a twelfth set of instructions configured to determine that interoperability between the service providing device is not possible if the result of the execution of the test code is not successful and the predetermined number of results has been received.

20. The instructions of claim 19, wherein:

the function expansion module corresponds to the result of the execution of the test code received from the service providing device; and the eleventh set of instructions comprises a thirteenth set of instructions configured to generate the function expansion module by searching a table for the function expansion module.

21. The instructions of claim 18, further comprising:

a fourteenth set of instructions configured to:
repeat the transmitting of the test code and the receiving of the result of the execution of the test code at least a predetermined number of times if the result of the execution of the test code is a failure; and
change the test code for each repetition.

22. The instructions of claim 18, wherein:

the test code corresponds to the service to be performed and the device information received from the service providing device;

if it is determined that the test code cannot be generated, interoperability is determined not to be possible with the service providing device; and the second set of instructions comprises a fifteenth set of instructions configured to search a table that stores every type of test code for the test code.

23. The method of claim 3, wherein the table stores every type of function expansion module.

24. The device of claim 12, wherein the function expansion module generation unit is further configured to search a table storing every type of function expansion module to generate the function expansion module.

25. The device of claim 17, wherein the table stores every type of test code.

26. The instructions of claim 20, wherein the table stores every type of function expansion module.

* * * * *